United States Patent [19]

Nakatani

[11] Patent Number: 4,609,174

[45] Date of Patent: Sep. 2, 1986

[54] FOLDABLE EASEL

[76] Inventor: Koma Nakatani, 12-17 chome Nakai, Shinjuku-ku Tokyo, Japan, 161

[21] Appl. No.: 668,471

[22] Filed: Nov. 5, 1984

[51] Int. Cl.[4] ............................................. A47B 97/04
[52] U.S. Cl. .................................... 248/465; 248/168
[58] Field of Search .............. 248/460, 464, 465, 449, 248/165, 168, 463; 182/182

[56] References Cited

U.S. PATENT DOCUMENTS

| | | | |
|---|---|---|---|
| 404,146 | 5/1889 | Ackerman | 248/467 |
| 2,064,232 | 12/1936 | Tepper | 248/460 |
| 2,550,550 | 4/1951 | Goodstein | 248/465 |
| 3,140,558 | 7/1964 | Cassidy | 248/448 |
| 3,244,450 | 4/1966 | Boutir | 248/460 |
| 3,304,045 | 2/1967 | Bethoney | 248/465 |
| 4,015,806 | 4/1977 | Catermole | 248/168 |
| 4,171,116 | 10/1979 | Carver | 248/465 |
| 4,326,687 | 4/1982 | Clyburn | 248/168 |

FOREIGN PATENT DOCUMENTS

| | | | |
|---|---|---|---|
| 3043043 | 5/1981 | Fed. Rep. of Germany | 248/421 |
| 8998 | of 1887 | United Kingdom | 248/460 |
| 612211 | 11/1948 | United Kingdom | 248/449 |

Primary Examiner—Reinaldo P. Machado
Assistant Examiner—Alvin Chin Shue

[57] ABSTRACT

A folding easel has three telescoping legs, leg locks for locking each of the legs at arbitrarily extended positions, two tie-bars each hinged at one end to an axle supported on a corresponding leg lock, one tie-bar being snap-engageable to an axle on a third leg lock, the remaining tie-bar being snap-engageable to an intermediate point of the first tie-bar to form a T tie-bar arrangement for maintaining the three legs in fixed spaced apart relationship and usable as a shelf for paint boxes or the like, the tie-bars being readily disengageable without removal of fasteners for folding together of the three legs.

9 Claims, 6 Drawing Figures

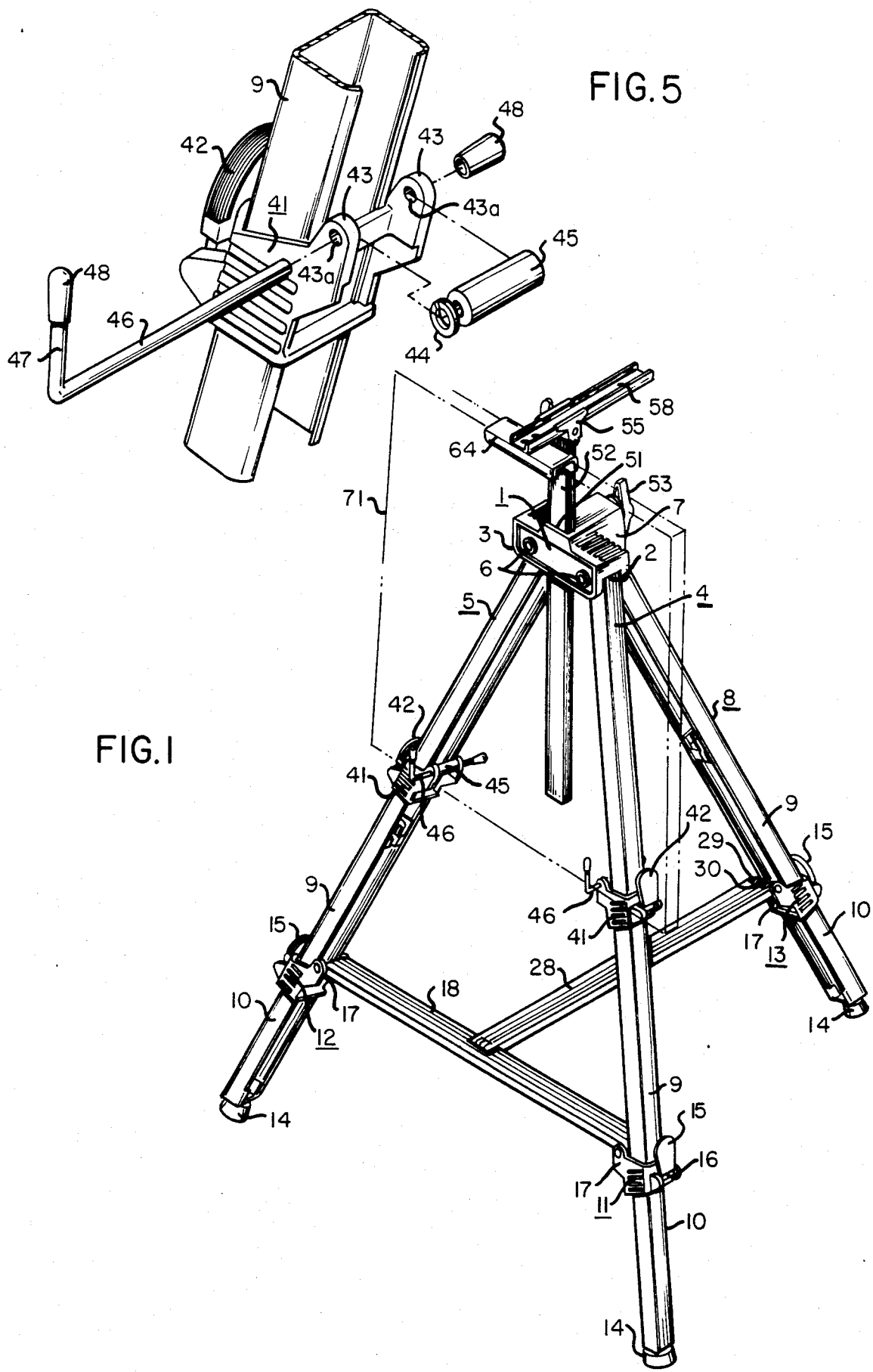

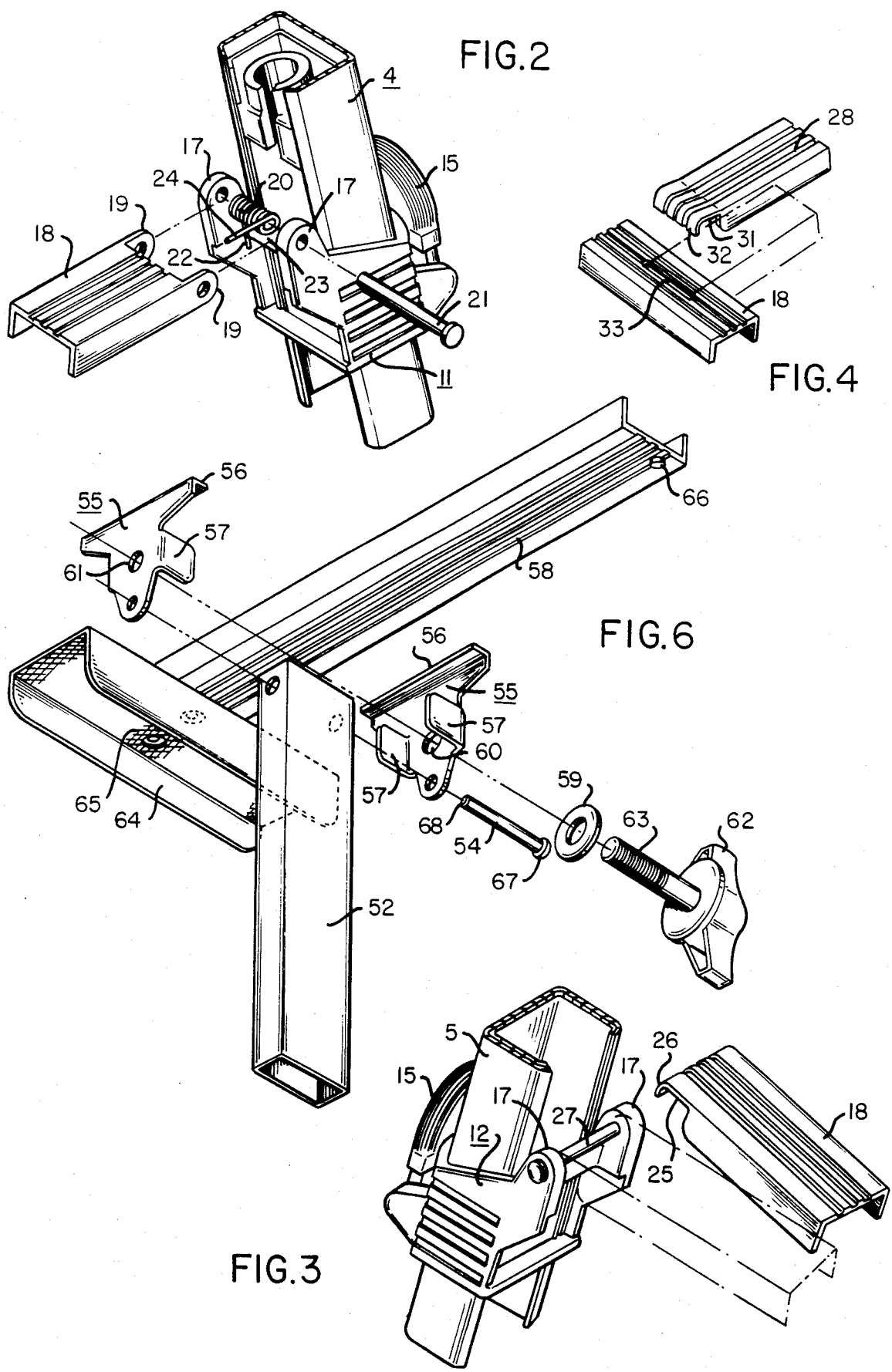

FOLDABLE EASEL

BACKGROUND OF THE INVENTION

1. Field of the Invention

The present invention pertains generally to the field of easels for supporting a canvas or the like, and more particularly relates to a foldable lightweight easel.

2. State of the Prior Art

Easels have been used for a long time for the purpose of supporting a canvas, either while it is being worked on or for exhibiting a canvas or the like. Easels foldable to a compact configuration for easy transportation and storage are also known. Typically, foldable easels have three legs which are pivotable between a folded together, mutually parallel position and deployed mutually divergent position for stably supporting the object to be displayed thereon. In such deployed position the three legs are interconnected at an intermediate point to prevent the legs from spreading apart and collapsing. Various means are known for so interconnecting the legs of the easel, such as tie-bars which interconnect each of the easel legs to a central hub element in a figure Y arrangement. In other easels, chains are used for tying together the legs and limiting their outward spread in an unfolded condition.

It was found that artists using such easels, particularly under field conditions, often require a convenient support for their paint boxes, brush boxes, and similar articles used while working on a canvas on the easel. While it would be convenient to use the tie-bars interconnecting the three legs for such support, existing foldable easels are not suited for this purpose. In the case where chains are used for interconnecting the legs, the chains too readily yield under the weight of objects placed thereon, and are incapable of providing stable support for boxes or the like placed thereon. In the case of radial tie-bars pivotably connected to a central hub. The radial tie-bars pivot upwardly to raise the center hub up between the legs when the three legs of the easel are folded together. Thus, due to the central pivoting of such a radial tie-bar arrangement, the structure is vulnerable to forces acting downwardly on the central hub and is therefore unsuited for supporting any substantial weight placed on the tie-bars.

A continuing need therefore exists for improved folding easels which provide a convenient and reliable support for paint boxes or the like without increase in the complexity or weight of the easel.

SUMMARY OF THE INVENTION

These and other shortcomings of the prior art are overcome by the easel of this invention which includes three legs, each leg having an upper end and a lower end. The three legs are pivotably interconnected at their upper ends to allow movement of the lower ends between a folded together position and a deployed spaced apart position. A first rigid tie-bar is pivotably attached at one of its ends to a first leg for movement between a folded position in which the tie-bar is folded against and parallel to the leg, and an extended position in which the tie-bar may be detachably secured at its other, free end to a second one of the three legs. A second rigid tie-bar is pivotably attached at one of its ends to the third easel leg for movement between a folded position in which it too is folded against and parallel to the third leg, and an extended position in which the free opposite end of the second tie-bar can be releasably secured to the first tie-bar at an intermediate point thereof. When so extended and secured, the two tie-bars define a figure T which lies in a plane parallel to the ground surface on which stands the easel. Flat objects such as paint boxes, canvases, drawing paper, and the like, may be placed on and conveniently supported by the extended and interconnected tie-bars when the easel is set up.

The novel tie-bar arrangement of this easel does not have any weak points created by pivoting of the tie-bars at any point other than the connection of the tie-bars to their respective legs.

Conveniently, each tie-bar may be provided with a suitable spring acting at the pivotal mounting point of each tie-bar for supporting each of the tie-bars against its pivoting open onto the ground during deployment and set-up of the easel.

The easel is set up by unfolding the first and third legs to a spaced apart position, pivoting downwardly the first tie-bar to a horizontal position and engaging the free end of the tie-bar to the third leg. The second, or middle leg, which may also be considered the rear leg, is then pivoted away from the first and third leg, and the second tie-bar is pivoted downwardly to a horizontal position, and its free end is engaged to the mid point of the first tie-bar in a figure T arrangement, thus fixing the three easel legss in a stable, correctly spaced apart position. The interconnected tie-bars may now be used as a shelf or support for paint boxes and other supplies.

Yet other improvements over known easels, including a novel and economical, yet flexible and lightweight canvas support arrangement is disclosed below.

BRIEF DESCRIPTION OF THE DRAWINGS

FIG. 1 is a perspective view of a preferred embodiment of the novel easel.

FIG. 2 is an exploded detail view of the pivotal mounting of the tie-bars.

FIG. 3 shows in enlarged detail the snap lock of the free end of each tie-bar to another easel leg.

FIG. 4 is a detail view of the engagement of the second tie-bar to the first tie-bar.

FIG. 5 is an enlarged, partly exploded view of one of the lower canvas holders.

FIG. 6 is an exploded view of the upper canvas holder.

DETAILED DESCRIPTION OF THE PREFERRED EMBODIMENT

With reference to the drawings in general, and FIG. 1 in particular, the two front legs 4, 5 of the easel are fitted at their upper ends into axle recesses 2, 3 defined by a pivot head 1, each leg being secured to the pivot head by means of a shaft 6 for pivoting movement in a common plane. The upper end of the rear leg 8 is inserted into a rear axle recess 7, and the rear leg 8 is pivotably attached to the pivot head 1 by a shaft in a manner similar to the front legs 4 and 5 but pivotable in a plane perpendicular to the common plane of the first and third legs.

Each of the easel legs 4, 5 and 8 may be made from e.g. aluminum channel having a U cross section. Each of the three legs consists in this example of an upper or outer leg section 9, and an inner or lower leg section 10. The inner leg section 10 is telescopically slideable within the outer leg section 9, and each leg is provided with a leg lock 11, 12, 13, respectively, mounted to and fixed near the lower end of each outside leg section 9. The leg lock is actuable between a released and a locked position, for locking the inside leg section 10 at an arbitrarily extended position relative to the outer leg section 9. A shoe 14 of rubber or other suitable material may be fitted to the lower end of each lower leg section 10.

Each of the leg locks 11, 12 and 13 has a locking lever 15 provided with a cam element 16 disposed over an opening in the outer leg 9, and configured such that when the lever is pivoted to the locked position shown in FIG. 1, the cam element pushes against the inner leg 10 within the outer leg 9, urging the leg 10 against the outer leg in frictional locking engagement, thereby locking the two leg sections against telescoping movement. Each of the leg locks has a socket mount which includes a pair of parallel ears 17 extending upwardly and away from the inner side of the easel leg, on the side opposite that of the locking lever 15.

Turning now to FIG. 2, the mounting socket of the leg lock 11 on the front leg 4 has a pair of parallel ears 17 between which are disposed corresponding ears 19 on the first tie-bar 18. A helical spring 20 is inserted between the two tie-bar ears 19 coaxially about a shaft 21 which extends through aligned holes in the tie-bar ears 19 and leg lock ears 17 to thereby pivotably secure the tie-bar 18 to the leg 4, allowing the tie-bar to move up and down between a folded and an extended position. The spring 20 has one end 22 which acts against the inside surface 23 of the leg lock socket while the opposite end 24 of the coil spring is held captive underneath the tie-bar 18. The natural tendency of the coil spring is to unwind, the spring end 24 thus acting to support the tie-bar 18 against its own weight. When the legs are unfolded and the first tie-bar 18 is released downwardly, the action of the spring 18 prevents the free end of the tie-bar from dropping to the ground, and tends to maintain the tie-bar in a near horizontal attitude.

Turning now to FIG. 3, the opposite free end of the first tie-bar 18, which is a U channel in cross section, has cutouts 25 in the side flanges of the channel, and a bent edge 26. The second front leg 5 is provided with a leg lock 12 similar to leg lock 11 already described in connection with FIG. 2, and which is provided with a horizontally extending shaft 27 between its parallel ears 17. The free end of the tie-bar 18 pivots downwardly onto the shaft 27 which is received in a snap fit within the cutouts 25 and under the bend edge portion 26, which acts as a resilient spring element. The two front legs 4 and 5 are thus interconnected in fixed spaced apart relationship by the tie-bar 18.

Turning back to FIG. 1, the rear leg 8 is provided with a tie-bar support 29, similar to the front tie-bar support described in connection with FIG. 2, and provided with a spring 30 which is capable of supporting the rear tie-bar 28 almost horizontally without support of the front end of the rear tie-bar 28, in a manner similar to that of spring 20 of the front tie-bar support. As shown in FIG. 4, the free end of the rear tie-bar 28, which is also U-shaped in cross section, has a pair of cutouts 31 in its side flanges, and a bent edge 32 at its end. The second tie-bar is engaged to the first tie-bar 18 by inserting the bent edge 32 into a slot 33 defined at an intermediate point of the first tie-bar 18. The cutouts 31 and bent portion 32 are dimensioned such that a snap locking engagement takes place between the free end of the rear tie-bar 28 and the front tie-bar 18. When so engaged, the front and rear tie-bars 18, 28 form a T-shaped structure and maintain the three legs 4, 5, 8 at a correct angle of the deployment.

The interconnection of the three legs by the two tie-bars 18, 28 reinforces and stabilizes the three legs, and the tie-bars 18, 28 interconnected in a T configuration may be used as a shelf support for a paint box, etc. In fact, placing a load such as a paint box or the like on the interconnected tie-bars 18, 28 is beneficial to the easel's overall stability in that it tends to anchor the easel by lowering its center of gravity, and thus may prevent the easel from overturning, particularly in view of the fact that easels such as disclosed herein may be manufactured from lightweight aluminum, and when a canvas is placed thereon, the resultant center of gravity is relatively high off the ground, making the structure susceptible to tipping over.

Further, the springs 20, 30 provided in the pivotal mounting of the two tie-bars 18, 28 have the effect of supporting the tie-bars in a near horizontal position when the legs are deployed and the tie-bars are allowed to swing downwardly under their own weight. The result is that the free ends of the tie-bars naturally fall to and are suspended just over the portions with which the free ends of the tie-bars interlock to secure the easel in the deployed configuration. Similarly, when the tie-bars are released from mutual engagement in order to fold up the easel, they are easily raised to their folded position towards the inside of the respective legs 4, 8 with the assistance of the urging of the corresponding spring 20, 30. Thus, setting up and releasing the tie-bars 18, 28 is easily and quickly accomplished. The springs 20, 30 prevent the tie-bars 18, 28 from pivoting so far downwardly tht the ends of the tie-bars touch the ground and are soiled by mud, etc. The springs 20, 30 further are capable of absorbing shocks imposed on the tie-bar ears 19, etc., of each tie-bar 18, 20 since the pivoting movement of the tie-bars is stopped elastically by the corresponding spring 20, 30. Thus, there is no possibility that the tie-bar ears 19, or related portions, are damaged or bent.

Turning now to FIG. 5, each of the front legs 4 and 5 is provided with a lower canvas support whose position is adjustable by sliding movement along the outer leg section 9 of each leg 4 and 5. Each lower canvas support assembly includes a socket-like mounting member 41, which is freely slideable along the outer leg section 9 of each leg 4, 5. This mounting member 41 is similar to the equivalent mountiing elements provided in each of the leg locks 11, 12 and 13, and includes a locking lever 42 provided with a cam element adapted to engage the surface of the outer leg section 9 so as to make frictional locking engagement therewith, thereby to fix the mounting member 41 at an arbitrarily selected position along the outer leg section 9. Each of the mounting members 41 have a pair of axle-supporting ears 43 similar to ears 17 of the leg locks already described, and between which is disposed a tubular sleeve 45 made of synthetic resin or the like, and a spring washer 44. An L-shaped canvas holder 46 is inserted through aligned holes 43a in the portions 43 of the socket 41, and also through the washer 44 and tube 45. The diameter of the rod-like canvas holder 46 is somewhat larger than the inside diameter of the sleeve 45 so as to make a friction fit by the canvas holder 46 within the sleeve 45. The tube 45 is force-fitted between the pair of axle supports 43 with the washer 44. Thus, when the canvas holder 46 is swiveled within the support ears 43, frictional resistance takes place between the tube 45 and the support portions 43 of the socket 41. Thus, free swiveling of the canvas holder 46 is restricted by the elastic tube 45, and the bent leg 47 of the canvas holder 46 may be maintained pointing upwardly, and its position adjusted relative to the easel leg by both rotation of the holder, as well as pushing and pulling of the canvas holder axially through the aligned bores 43a in the socket 41, to thereby accommodate thicker or thinner canvases. End covers 48, preferably made of rubber or synthetic resin, are fitted onto both ends of the canvas holder 46. The spring washer 44 may, if desired, be eliminated, and only the elastic tube 45 used between the support ears 43.

Turning back to FIG. 1, the pivot head 1 has a slot 51 extending vertically therethrough and disposed between the two front legs 4 and 5. A vertical slide bar 52 is slideably inserted through this slot 51, and is movable up and down therethrough relative to the pivot head 1. A screw provided with a knob 53 is threadable into the pivot head 1 against the vertical slide bar 52, such that the slide bar may be locked or released relative to the pivot head 1 by means of this screw.

Turning now to FIG. 6, which illustrates the upper canvas holder assembly, it is seen that a pair of T-brackets 55 are pivotably mounted to the upper end of the vertical slide bar 52 by means of a shaft 54 extending through aligned bores in the T-brackets and the vertical slide bar. Each of the T-brackets has horizontal bar guides 56, 57 formed by bending the upper edge and the side edges, respectively, of each bracket. The bent portions of each bracket face the opposite T-bracket 55. A horizontal slide bar 58, which may be a U channel in cross section, is held between the bar guides 56, 57 of the two T-brackets, allowing the horizontal bar 58 to slide between the two brackets 55. A screw 63 provided with a knob 62 passes through washer 59 and enlarged hole 60 in one of the brackets 55, and is threaded into hole 61 in the other bracket 55. Thus, the two brackets held together by the screw 63 form a swivel whose fulcrum is the shaft 54. By tightening the screw 63, the two brackets 55 may be drawn together against the vertical slide bar 52, thus locking the brackets 55 against swiveling relative to the vertical bar, while simultaneously locking the horizontal slide bar 58 against sliding movement between the two brackets 55.

An upper canvas holder 64, which is concave in cross section, is affixed to the underside and at the end of the horizontal slide bar 58 at right angles thereto, to form a figure T as shown in FIGS. 1 and 6. An anti-skid rubber sheet 65 may be glued to the inner surface of the upper canvas holder 64. An end stop pin 66, or the like, extending downwardly from the opposite end of the horizontal bar 58 may be provided to prevent the slide bar 58 from being withdrawn from between the T-brackets 55, by locking against the upper end of the vertical slide bar 52 when such withdrawal is attempted.

The various shafts or axles 6, 21, 27, 54 are desirably provided with a hole 68 at one end, and a head 67 at the other end at each shaft, as best seen in the case of shaft 54 in FIG. 6. After each of these shafts are inserted into their corresponding supports, the shaft end with the hole 68 is flattened so as to enlarge its diameter and prevent the shaft or axle from being withdrawn.

When setting up this easel, the leg locks 11, 12, 13 of the three easel legs 4, 5, 8, respectively, are released by means of the locking levers 15 to thereby allow telecoping height adjustment of each leg, and the tie-bars 18, 28 are deployed and interconnected in the figure T in FIG. 1 in order to secure the three legs in fixed spaced apart relationship. The canvas support units 41 are then released and adjusted in height as required, and a canvas 71 shown in dotted lines in FIG. 1 is placed in the two canvas holders 46. The lock screw 53 of the vertical slide bar is loosened to allow sliding adjustment of the position of the vertical slide bar 52, as required by the size of the particular canvas 71. The two T-fasteners 55 at the upper end of the vertical slide bar are then loosened to allow movement of the horizontal slide bar 58, and thus allow the upper canvas holder 64 to be engaged with the upper edge of the canvas 71. Simultaneously, by sliding the horizontal slide bar 58 relative to the vertical slide bar, the angle of inclination of the canvas 71 on the easel may be adjusted by pushing or pulling the horizontal slide bar through the T-fasteners 55. Finally, the adjustments are secured by locking up the various elements by tightening the screws 53 and 63.

When folding up the easel, each tie-bar 18, 28 is released and pivoted upward towards its folded position against the respective leg 4, 8, and the three easel legs 4, 5, 8 are folded together. Then, the vertical slide bar 52 is slid downwardly, and the horizontal slide bar 58 is pulled out towards the front and swiveled downwardly. By this operation, the upper canvas holder 64 is folded down against the front easel legs 4, 5 into a compact folded configuration for easy transport and storage. It will be understood that while a coil spring is used for spring 20, the coil spring may be replaced by others springs such as plate springs, etc.

While a particular embodiment of the invention has been shown and illustrated for purposes of clarity, it will be understood that many changes, modifications and substitutions may be made by those possessed of ordinary skill in the art. Therefore, the scope of the invention is limited only by the following claims:

What is claimed is:

1. A folding easel having three legs, each leg having an upper end and a lower end, each leg being pivotably interconnected at its upper end to a pivot head to allow pivotal movement of a first and a second leg in a common plane between a folded mutually parallel position and a spaced apart position, a third leg being movable away from said first and second legs in a plane perpendicular to said common plate, each of said legs comprising at least two telescopically slideable leg sections and a first leg lock for securing said leg sections at an arbitrarily extended position against telescoping movement, each said first leg lock including a lock mounting socket, each said socket supporting an axle disposed transversely to said leg, a first rigid tie-bar pivotably attached at one end to said axle on said first leg for movement between a folded and an extended position, the free opposite end of said first tie-bar being releasably engageable in its extended position to said axle on said second leg, and a second rigid tie-bar pivotably attached at one end to said axle on said third leg for movement between a folded position and an extended position, the opposite free end of said second tie-bar in its extended position being releasably engageable to an intermediate point of said first tie-bar thereby to secure said three legs in fixed spaced apart relationship with said two tie-bars forming a figure T usable as a shelf support for paint boxes or the like;

said free ends of both first and second tie-bars being engageable respectively to said axle and said intermediate point by a snap locking engagement readily disengageable without removal of fasteners.

2. The easel of claim 1 further comprising helical coil spring means wound about said axle on said first and third legs and mounted for supporting each of said tie-bars against downward pivotal movement into contact with a ground surface.

3. The easel of claim 1 further comprising spring means for supporting each of said tie-bars when said tie-bars are pivoted towards their extended positions to prevent the free ends of the tie-bars from dropping into contact with the ground.

4. The easel of claim 1 further comprising a second lock slideable along each of said first and second legs and releasably securable to said leg at any arbitrary point between said first lock and said upper end, each said second lock having a pair of ears through which extends one leg of an L-shaped canvas holder, all of said first and second locks being substantially identical except for the elements supported by the ears of each said lock.

5. The easel of claim 1 further comprising an upper canvas holder assembly mounted to said pivot head, said upper canvas holder assembly being adjustable in height relative to said pivot head.

6. The easel of claim 5 wherein said upper canvas holder assembly comprises a vertical slide bar slideable relative to said pivot head, a horizontal slide bar and an upper canvas holder mounted thereto, said horizontal slide bar being mounted to the upper end of said vertical slide bar for pivotal movement in a vertical plane and also for sliding movement relative to said vertical slide bar; and first and second fastener means for securing said vertical and horizontal slide bars against movement relative to said pivot head.

7. The easel of claim 6 wherein said canvas holder is a cross-member mounted to said horizontal slide bar in a T-configuration.

8. The easel of claim 7 wherein said cross-member is a U-shaped channel in cross section mounted for receiving the upper edge of a canvas or the like within said channel.

9. The easel of claim 8 further comprising anti-skid means disposed within said channel.

* * * * *